(12) United States Patent  (10) Patent No.: US 8,961,859 B2
Chinomi et al.  (45) Date of Patent: Feb. 24, 2015

(54) EXPANDABLE POLYSTYRENE RESIN PARTICLES, METHOD FOR PRODUCTION THEREOF, AND MOLDED FOAM PRODUCT

(75) Inventors: Ryosuke Chinomi, Koga (JP); Hiroyuki Tarumoto, Koga (JP); Yoshifumi Saitou, Koga (JP)

(73) Assignee: Sekisui Plastics Co., Ltd., Osaka (JP)

( * ) Notice: Subject to any disclaimer, the term of this patent is extended or adjusted under 35 U.S.C. 154(b) by 98 days.

(21) Appl. No.: 12/865,173

(22) PCT Filed: Jan. 23, 2009

(86) PCT No.: PCT/JP2009/051121
§ 371 (c)(1),
(2), (4) Date: Jul. 29, 2010

(87) PCT Pub. No.: WO2009/096341
PCT Pub. Date: Aug. 6, 2009

(65) Prior Publication Data
US 2011/0009508 A1    Jan. 13, 2011

(30) Foreign Application Priority Data
Jan. 30, 2008  (JP) ................. P2008-018999

(51) Int. Cl.
*B29C 67/00*  (2006.01)
*B29B 9/06*  (2006.01)
(Continued)

(52) U.S. Cl.
CPC .............. *B29B 9/065* (2013.01); *B29C 44/3461* (2013.01); *B29C 44/445* (2013.01);
(Continued)

(58) Field of Classification Search
USPC ........ 521/56, 59, 60, 139, 146; 264/118, 141, 264/415, 419
See application file for complete search history.

(56) References Cited

U.S. PATENT DOCUMENTS

2005/0156344 A1  7/2005  Dietzen et al.
2005/0239913 A1*  10/2005  Casalini et al. ............... 521/50
(Continued)

FOREIGN PATENT DOCUMENTS

EP  1 857 242 A1  11/2007
GB  1 352 330 A  5/1974
(Continued)

OTHER PUBLICATIONS

International Search Report for the Application No. PCT/JP2009/051121 mailed Apr. 21, 2009.
(Continued)

*Primary Examiner* — Michael L Leonard
(74) *Attorney, Agent, or Firm* — Cheng Law Group, PLLC

(57) ABSTRACT

There are provided expandable polystyrene resin particles formed by granulating a polystyrene resin containing an expanding agent, wherein the weight-average molecular weight Mw of the polystyrene resin is in the range of 120,000 to 270,000, and the expanding agent contains, as an essential component, pentane at a proportion of 3 to 8 parts by mass based on 100 parts by mass of the polystyrene resin, while the composition of the pentane is in the range of isopentane: normal pentane=10:90 to 80:20 by mass ratio. These expandable polystyrene resin particles can utilize a recycled raw material, and can produce a molded foam product having sufficient mechanical strength, while the expandable polystyrene resin particles have a long bead life and excellent low pressure moldability.

5 Claims, 1 Drawing Sheet

(51) Int. Cl.
 *B29C 44/34* (2006.01)
 *B29C 44/44* (2006.01)
 *C08J 9/16* (2006.01)
 *B29K 25/00* (2006.01)
 *B29K 105/04* (2006.01)

(52) U.S. Cl.
 CPC .............. *C08J 9/16* (2013.01); *B29K 2025/06* (2013.01); *B29K 2105/048* (2013.01); *C08J 2203/14* (2013.01); *C08J 2325/06* (2013.01)
 USPC ........... 264/419; 264/118; 264/141; 264/415; 521/56; 521/59; 521/60; 521/139; 521/146

(56) References Cited

U.S. PATENT DOCUMENTS

| | | | |
|---|---|---|---|
| 2006/0273482 A1 | 12/2006 | Kobayashi et al. | |
| 2008/0096988 A1* | 4/2008 | Hahn et al. | 521/56 |
| 2008/0203597 A1* | 8/2008 | Rogov et al. | 264/51 |

FOREIGN PATENT DOCUMENTS

| | | | | |
|---|---|---|---|---|
| JP | 2004-244529 A | 9/2004 | | |
| JP | 2004-315806 A | 11/2004 | | |
| JP | 2005-112882 A | 4/2005 | | |
| JP | 2005-534733 A | 11/2005 | | |
| JP | 2007-217711 A | 8/2007 | | |
| WO | WO-2005/028173 A1 | 3/2005 | | |
| WO | WO-2006/061571 | * | 6/2006 | ............... C08K 3/04 |
| WO | WO 2006088392 A1 | * | 8/2006 | .............. B29C 44/34 |

OTHER PUBLICATIONS

Supplementary European Search Report for the Application No. EP 09 70 6895 dated Sep. 29, 2011.
Liang, Guangze, "Full-mold Casting (Revised Version)", Shanghai Science and Technology Press, 1st Version, 1986, pp. 25-27.
Chinese Office Action for the Application No. 200980103247.3 mailed Sep. 9, 2014.

* cited by examiner

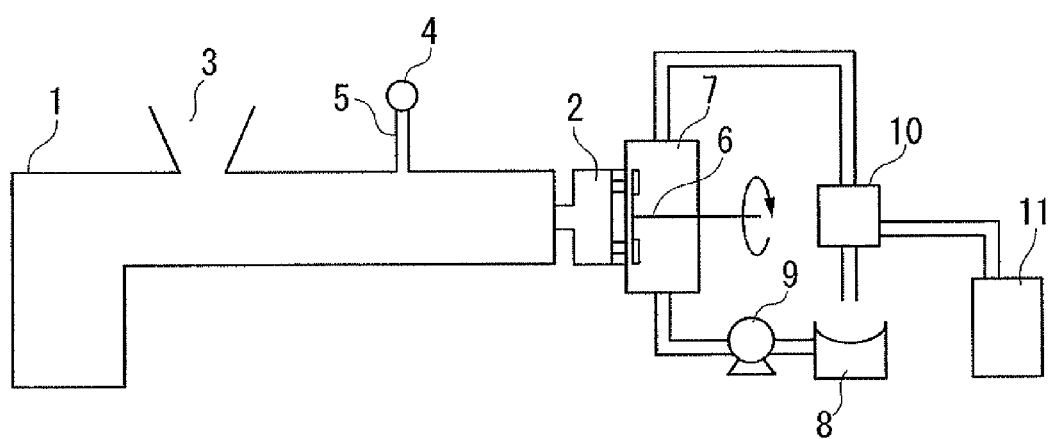

EXPANDABLE POLYSTYRENE RESIN PARTICLES, METHOD FOR PRODUCTION THEREOF, AND MOLDED FOAM PRODUCT

TECHNICAL FIELD

The present invention relates to expandable polystyrene resin particles obtainable by a melt extrusion method. Particularly the invention relates to expandable polystyrene resin particles having a long bead life and excellent low pressure moldability, which are capable of producing a molded foam product having sufficient mechanical strength by incorporating a specific amount of an expanding agent having a specific composition into a polystyrene resin having a specific weight-average molecular weight Mw.

The present application claims priority based on Japanese Patent Application No. 2008-018999 filed on Jan. 30, 2008, the disclosure of which is incorporated herein by reference.

BACKGROUND ART

A melt extrusion method is a method for obtaining expandable polystyrene resin particles by injecting and kneading an expanding agent into a molten polystyrene resin, in an extruder, extruding the molten resin containing the expanding agent directly into a liquid for cooling through an orifice of a die installed at the front end of the extruder, and cutting the extrusion product with a rapidly rotating blade simultaneously with the extruding, while solidifying the extrusion product by cooling through contact with the liquid.

In the past, in regard to the method for producing expandable polystyrene resin particles by a melt extrusion method, there have been suggested, for example, technologies disclosed in Patent Documents 1 and 2.

Patent Document 1 discloses a method for producing an expanded styrene polymer having a molecular weight Mw of greater than 170,000 g/mole. The method is characterized in that an expanding agent-containing molten styrene polymer product having a temperature of at least 120° C. is conveyed through a die plate having holes with a hole diameter of 1.5 mm or less at the die outlet, and then the extrusion product is granulated.

Patent Document 2 discloses a method for producing thermoplastic expandable resin particles, in which expandable particles are obtained by injecting an expanding agent into a molten thermoplastic resin in an extruder, extruding the molten resin containing the expanding agent directly into a liquid for cooling through a number of orifices of a die installed at the front end of the extruder, cutting the extrusion product with a rapidly rotating blade simultaneously with the extruding, while solidifying the extrusion product by cooling through contact with a liquid. In the method, the extruding is performed such that the shear rate of the expanding agent-containing molten resin upon passing through the orifice land area of the die is 12,000 to 35,000 $sec^{-1}$, and the apparent melt viscosity of the resin is 100 to 700 poise.

[Patent Document 1] PCT Japanese Translation Patent Publication No. 2005-534733

[Patent Document 2] Pamphlet of WO 2005/028173

DISCLOSURE OF THE INVENTION

Problem to be Solved by the Invention

However, the related art disclosed in the Patent Documents 1 and 2 have the following problems.

The method described in Patent Document 1 uses a styrene polymer having a molecular weight Mw of greater than 170,000 g/mole. Therefore, the decrease in expandability over time is large, while the bead life is short. Furthermore, in the Embodiments of the Patent Document 1, n-pentane is used as an expanding agent. However, when an experiment was carried out in the Examples as described later, if only n-pentane is used as the expanding agent, the bead life of the expandable polystyrene resin particles is shortened as described in Comparative Example 5 below, and thus long-term storage is not possible. There also occurs a decrease in the expansion ratio over time. Furthermore, because low pressure moldability is poor, the water vapor pressure cannot be lowered at the time of expansion molding, and energy saving cannot be promoted.

Patent Document 2 describes an Embodiment of using isopentane only as an expanding agent. However, when an experiment was carried out in the Embodiments as described later, if only isopentane is used as the expanding agent, cooling upon obtaining a molded foam product takes a long time as described in Comparative Examples 3 and 4. Thus, the molding cycle cannot be shortened, resulting in low productivity.

In recent years, as one of the measures intended to be taken against the generation of environmental problems in various fields, recycling of raw material resins is promoted even in the field of production of polystyrene resin molded foam products. At present, researches has been in progress to allow several ten percent or more of a recovered raw material of polystyrene resin (hereinafter, referred to as recycled raw material) to be used in the raw material resin. In order to realize this recycling, there is a demand for a method for producing expandable polystyrene resin particles, which is capable of easily producing expandable polystyrene resin particles even in the case of using recycled raw materials, and capable of making the expansion characteristics of the obtained expandable polystyrene resin particles, the mechanical strength of a molded product or the like sufficient for actual use.

Under such circumstances, it is an object of the invention to provide expandable polystyrene resin particles having a long bead life and excellent low pressure moldability, which can utilize recycled raw materials and can produce a molded foam product having sufficient mechanical strength.

Technical Solution

In order to achieve the object described above, the invention provides expandable polystyrene resin particles formed by granulating a polystyrene resin containing an expanding agent. The expandable polystyrene resin particles have the weight-average molecular weight Mw of the polystyrene resin is in the range of 120,000 to 270,000. The expanding agent contains, as an essential component, pentane at a proportion of 3 to 8 parts by mass based on 100 parts by mass of the polystyrene resin. The composition of the pentane is in the range of isopentane:normal pentane=10:90 to 80:20 by mass ratio.

It is preferable that the expandable polystyrene resin particles of the invention are obtained by a melt extrusion method. In the melt extrusion method, the expandable polystyrene resin particles are obtained by injecting and kneading an expanding agent into a molten polystyrene resin in an extruder, extruding the molten resin containing the expanding agent directly into a liquid for cooling through an orifice of a die installed at the front end of the extruder, and cutting the extrusion product with a rapidly rotating blade simultaneously with the extruding, while solidifying the extrusion product by cooling through contact with the liquid.

The invention also provides a molded foam product obtained by heating the expandable polystyrene resin particles according to the invention to form pre-expanded particles, and in-mold expansion molding the pre-expanded particles.

Regarding the molded foam product of the invention, it is preferable that the average cell diameter of the foam grains in the molded foam product is in the range of 100 µm to 500 µm.

The invention also provides a method for producing expandable polystyrene resin particles, which includes injecting and kneading an expanding agent into a molten polystyrene resin in an extruder, extruding the molten resin containing the expanding agent directly into a liquid for cooling through an orifice of a die installed at the front end of the extruder, and cutting the extrusion product with a rapidly rotating blade simultaneously with the extruding, while solidifying the extrusion product by cooling through contact with a liquid. The method is characterized in that the weight-average molecular weight Mw of the polystyrene resin is in the range of 120,000 to 270,000, the expanding agent contains, as an essential component, pentane at a proportion of 3 to 8 parts by mass based on 100 parts by mass of the polystyrene resin, and the composition of the pentane is in the range of isopentane:normal pentane=10:90 to 80:20 by mass ratio.

Effects of the Invention

The expandable polystyrene resin particles of the invention are such that the weight-average molecular weight Mw of the polystyrene resin is in the range of 120,000 to 270,000, and the expanding agent contains, as a main component, a pentane in the range of isopentane:normal pentane=10:90 to 80:20 by mass ratio. Thus, the amount of expanding agent used to obtain the same expansion ratio can be reduced.

The expandable polystyrene resin particles of the invention are such that the decrease in expandability over time is small, and the bead life is long.

The expandable polystyrene resin particles of the invention have excellent low pressure expandability, and the water vapor pressure at the time of expansion molding can be lowered. Thus, energy savings can be promoted.

The molded foam product obtained by expansion molding the expandable polystyrene resin particles of the invention has sufficient mechanical strength, and particularly, even when a recycled raw material is used as the polystyrene resin, a mechanical strength that is close to that of a virgin raw material can be obtained.

BRIEF DESCRIPTION OF THE DRAWINGS

FIG. 1 is a constitutional diagram showing an example of the production apparatus used in the method for producing expandable polystyrene resin particles of the invention.

DESCRIPTION OF THE REFERENCE NUMERALS

1 EXTRUDER
2 DIE
3 RAW MATERIAL FEEDING HOPPER
4 HIGH PRESSURE PUMP
5 EXPANDING AGENT SUPPLY INLET
6 CUTTER
7 CUTTING CHAMBER
8 WATER TANK
9 HIGH PRESSURE PUMP
10 DEHYDRATING DRYER WITH SOLID-LIQUID SEPARATING FUNCTION
11 STORAGE VESSEL

BEST MODE FOR CARRYING OUT THE INVENTION

The expandable polystyrene resin particles of the invention are expandable polystyrene resin particles formed by granulating a polystyrene resin containing an expandable agent. The expandable polystyrene resin particles are characterized in that the weight-average molecular weight Mw of the polystyrene resin is in the range of 120,000 to 270,000, the expanding agent contains, as an essential component, pentane at a proportion of 3 to 8 parts by mass based on 100 parts by weight of the polystyrene resin, and the composition of the pentane is in the range of isopentane:normal pentane=10:90 to 80:20 by mass ratio.

In regard to the expandable polystyrene resin particles of the invention, the polystyrene resin is not particularly limited. For example, the polystyrene resin includes homopolymers of styrene monomers such as styrene, α-methylstyrene, vinyltoluene, chlorostyrene, ethylstyrene, i-propylstyrene, dimethylstyrene and bromostyrene, and copolymers thereof. A polystyrene resin containing 50% by mass or more of styrene is preferred, and polystyrene is more preferred.

The polystyrene resin may be a copolymer of the styrene monomer and a vinyl monomer capable of being copolymerized with this styrene monomer, which contains the styrene monomer as a main component. Such a vinyl monomer includes, for example, alkyl (meth)acrylates such as methyl (meth)acrylate, ethyl (meth)acrylate, butyl (meth)acrylate and cetyl (meth)acrylate; (meth)acrylonitrile, dimethyl maleate, dimethyl fumarate, diethyl fumarate, ethyl fumarate; as well as bifunctional monomers such as divinylbenzene and alkylene glycol dimethacrylate; and the like.

If the polystyrene resin is a main component, other resin may also be added. The resin that are added includes, for example, in order to enhance the impact resistance of the molded foam product, rubber-modified polystyrene resins added with diene-based rubber-like polymers such as polybutadiene, a styrene-butadiene copolymer, and an ethylene-propylene-non-conjugated diene terpolymer, that is, a so-called high-impact polystyrene. And the resin that are added includes, as other examples, a polyethylene resin, a polypropylene resin, an acrylic resin, an acrylonitrile-styrene copolymer, an acrylonitrile-butadiene-styrene copolymer, and the like.

For the polystyrene resin that is used as a raw material for the expandable polystyrene resin particles of the invention, a polystyrene resin that is not a recycled raw material (hereinafter, indicated as virgin polystyrene), such as a commercially available conventional polystyrene resin, or a polystyrene resin newly produced by a suspension polymerization method, can be used. A recycled raw material obtainable by subjecting a used polystyrene resin molded foam product to a regeneration treatment also can be used. For this recycled raw material, a raw material having a weight-average molecular weight Mw in the range of 120,000 to 270,000 is appropriately selected from among the recycled raw materials and can be used, or a plurality of recycled raw materials having different weight-average molecular weights Mw can be used in appropriate combination. The recycled raw materials are obtained by collecting used polystyrene resin molded foam products, for example, fish boxes, electrical appliance shock-absorbers, food packaging trays and the like, and regenerating them by a limonene dissolution method or a heating volume reduction method.

Also for the recycled raw material that can be used, a material obtained by regenerating a used polystyrene resin molded foam product, as well as a material obtained by pulverizing non-expanded polystyrene resin molded products that have been sorted and collected from electrical appliance products (for example, television, refrigerator, washing machine, air conditioner, and the like) or office instruments (for example, copying machine, facsimile, printer, and the like), melt kneading and repelletizing the pulverization product, can be used.

In regard to the expandable polystyrene resin particles of the invention, the weight-average molecular weight Mw of the polystyrene resin that constitutes the expandable polystyrene resin particles is in the range of 120,000 to 270,000, and more preferably in the range of 140,000 to 215,000. The weight-average molecular weight is more preferably in the range of 140,000 to 185,000, even more preferably in the range of 140,000 to 170,000, and most preferably in the range of 140,000 to 165,000. If the weight-average molecular weight Mw of the polystyrene resin is less than the above range, the high pressure moldability of the expandable polystyrene resin particles decreases, and the mechanical strength of the obtainable molded foam product is likely to be decreased. If the weight-average molecular weight Mw of the polystyrene resin exceeds the above range, the low pressure moldability decreases, and it is difficult to shorten the heating time for expansion molding.

As the expanding agent that is incorporated into the polystyrene resin for the expandable polystyrene resin particles of the invention, pentane (pentane composition) having a composition in the range of isopentane:normal pentane=10:90 to 80:20, and more preferably 20:80 to 40:60, by mass ratio can be used singly, or an expanding agent obtained by adding another volatile expanding agent as an auxiliary component for pentane, can be used. It is particularly preferable to use the pentane composition alone. Examples of the auxiliary component that can be added to the pentane include aliphatic hydrocarbons such as propane, normal butane and isobutane; terpene hydrocarbons such as limonene and pinene; aromatic hydrocarbons such as styrene, toluene, ethylbenzene and xylene; alicyclic hydrocarbons such as cyclopentane and cyclohexane; halogenated hydrocarbons such as fluorinated ethane; and the like.

When the ratio of isopentane and normal pentane of this expanding agent is such that the proportion of isopentane is larger than the range of mass ratio described above, or when only isopentane is used, after heating by blowing water vapor for heating into the cavity of a molding mold filled with pre-expanded particles, the cooling time taken to cool the molded foam product to a temperature possible for removal from the mold, is significantly lengthened, and productivity is decreased when the molded foam product is produced from the expandable polystyrene resin particles. On the other hand, when the proportion of normal pentane is larger than the range of mass ratio, or when only normal pentane is used, the bead life of the expandable polystyrene resin particles is shortened, so that the resin particles cannot be put to long-term storage, and the expansion ratio over time is decreased. Furthermore, the low pressure moldability decreases, so that the water vapor pressure at the time expansion molding to obtain a molded foam product cannot be lowered, and energy savings cannot be promoted.

In the expandable polystyrene resin particles of the invention, the amount of the expanding agent incorporated into the polystyrene resin is, in terms of pentane (pentane composition) as described above, in the range of 3 to 8 parts by mass, more preferably in the range of 4 to 6 parts by mass, and most preferably in the range of 4.0 to 5.5 parts by mass, based on 100 parts by mass of the polystyrene resin. If the amount of pentane is less than the above, there is a possibility that when the expandable polystyrene resin particles are expansion molded, a sufficient expansion ratio may not be achieved. On the other hand, if the amount of pentane exceeds the above range, the improvement of expansion performance reaches the limitation, and this is not suitable for the purpose of promoting a decrease in the amount of use of the expanding agent.

Regarding the expandable polystyrene resin particles of the invention, in addition to the expanding agent, other additives that are generally used in the production of expandable polystyrene resin particles can be added to the polystyrene resin as necessary. Examples of the additives include expansion nucleating agents such as talc, calcium silicate, synthetic or naturally occurring silicon dioxide, and ethylenebisstearic acid amide; copolymer of methacrylate ester, flame retardants such as hexabromocyclododecane, tetrabromobisphenol A-bis(2,3-dibromo-2-methyl propyl ether) and triallyl isocyanurate hexabromide; colorants such as carbon black, iron oxide and graphite; and the like.

The surface of the expandable polystyrene resin particles of the invention can be coated with a surface treating agent such as a fatty acid metal salt, a fatty acid ester or an antistatic agent, as such coating is usually carried out for conventional expanded styrene resin particles. Thus, the fluidity, pre-expansion characteristics and the like of the resin particles (beads) can be improved by performing the coating of surface treating agents. The total amount of addition of the surface treating agents is preferably an amount of about 0.01 to 2.0 parts by mass based on 100 parts by mass of the expandable polystyrene resin particles.

The expandable polystyrene resin particles of the invention can maintain sufficient expansion performance even after storage of about one month, if the bead life is long and the temperature is low. Production of a molded foam product from the expandable polystyrene resin particles of the invention can be carried out according to a conventional in-mold expansion molding method using expandable polystyrene resin particles. That is, the production can be carried out by heating the expandable polystyrene resin particles to form pre-expansion particles, filling the pre-expansion particles in the cavity of a molding mold having a cavity of the shape intended to be formed by the pre-expansion particles, heating the particles by blowing water vapor, performing in-mold expansion molding, cooling the molding mold, and removing the molded foam product.

The molded foam product of the invention is such that the average cell diameter of the foam grains is preferably in the range of 100 µm to 500 µm, and more preferably in the range of 150 µm to 300 mm. Furthermore, this molded foam product usually has a density of 0.015 to 0.2 g/cm$^3$. Preferably, the density is in the range of 0.0166 to 0.05 g/cm$^3$, and more preferably, the density is in the range of 0.02 to 0.033 g/cm$^3$. If the density of the molded foam product is smaller than 0.015 g/cm$^3$, the strength of the molded foam product that is obtained by expanding the pre-expanded particles decreases, and thus is not preferable. On the other hand, if the density of the molded foam product is larger than 0.2 g/cm$^3$, the mass of the molded foam product that is obtained by expanding the pre-expanded particles increases, and thus it is not preferable. Furthermore, when this density is indicated as the expansion ratio, the expansion density (fold)=1/density (g/cm$^3$). Thus, this molded foam product has an expansion ratio of 5 to 67 (fold), and the expansion ratio is preferably 20 to 60 (fold), and more preferably 30 to 50 (fold).

The expandable polystyrene resin particles of the invention can be produced by conventionally well-known methods for producing expandable polystyrene resin particles, for example, a suspension polymerization method and a melt extrusion method. However, since expandable polystyrene resin particles can be easily produced from a recycled raw material, it is preferable to produce the expandable polystyrene resin particles according to a melt extrusion method. According to the melt extrusion method, expandable polystyrene resin particles are obtained by injecting and kneading an expanding agent into a molten polystyrene resin in an extruder, extruding the molten resin containing the expanding agent directly into a liquid for cooling through an orifice of a die installed at the front end of the extruder, and cutting the extrusion product with a rapidly rotating blade simultaneously with the extruding, while solidifying the extrusion product by cooling through contact with a liquid.

FIG. 1 is a constitutional diagram showing an example of the production apparatus used in the method for producing expandable polystyrene resin particles of the invention. The production apparatus of this example includes an extruder 1; a die 2 having a number of orifices installed at the front end of the extruder 1; a raw material feeding hopper 3 that introduces resin raw materials and the like into the extruder 1; a high pressure pump 4 that injects an expanding agent into the molten resin in the extruder 1 through an expanding agent supply inlet 5; a cutting chamber 7 that is installed to contact cooling water with the resin ejecting surface having the orifices of the die 2 perforated thereon, so that cooling water is supplied to circulate in the chamber; a cutter 6 that is installed to be rotatable in the cutting chamber 7 so as to cut the resin extruded from the orifices of the die 2; a dehydrating dryer 10 with a solid-liquid separating function, in which expandable particles transferred from the cutting chamber 7 along with the flow of the cooling water, are separated from the cooling water and are simultaneously dehydrated and dried to obtain expandable particles; a water tank 8 that collects the cooling water separated from the dehydrating dryer 10 with a solid-liquid separating function; a high pressure pump 9 that sends the cooling water in this water tank 8 to the cutting chamber 7; and a storage vessel 11 that stores the expandable particles dehydrated and dried in the dehydrating dryer 10 with a solid-liquid separating function.

As the extruder, an extruder which uses a screw and an extruder which does not use a screw, can all be used. Examples of the extruder that uses a screw include a single-screw type extruder, a multi-screw type extruder, a bent type extruder, a tandem type extruder, and the like. Examples of the extruder that does not use a screw include a plunger type extruder, a gear pump type extruder, and the like. All of these extruders can use a static mixer. Among these extruders, an extruder that uses a screw is preferred in view of productivity.

In order to produce the expandable polystyrene resin particles of the invention using this production apparatus, first, the raw material polystyrene resin, and desired additives such as an expansion nucleating agent, are weighed and introduced into the extruder 1 from the raw material feeding hopper 3. The raw material polystyrene resin may be mixed thoroughly in advance in a pellet form or in a granular form, and then introduced from a single raw material feeding hopper. Alternatively, for example, in the case of using a plurality of lots, the polystyrene resin may be introduced from a plurality of raw material feeding hoppers having the feed amount adjusted for each lot, and mixed in an extruder. Furthermore, in the case of using recycled raw materials from a plurality of lots in combination, it is preferable that the raw materials from the plurality of lots may be thoroughly mixed in advance and then magnetically screened or sorted with a sieve, and any foreign matters are removed by appropriate screening means such as specific gravity screening and air blowing screening.

The polystyrene resin is supplied into the extruder 1, and then this resin is heated to melt. An expanding agent is mixed with the molten product by injecting the expanding agent through the expanding agent supply inlet 5 by the high pressure pump 4. The molten product is transported to the front end side through a screen for removal of foreign matters, which is installed in the extruder 1 as necessary, while further kneading the molten product. The molten product added with the expanding agent is extruded through an orifice of the die 2 installed at the front end of the extruder 1.

The resin ejecting surface having the orifice of the die 2 perforated thereon is disposed in the cutting chamber 7, where cooling water is supplied to circulate therein. Meanwhile, the cutter 6 is installed to be rotatable in the cutting chamber 7, so that the cutter can cut the resin extruded from the orifice of the die 2. When the molten product added with the expanding agent is extruded from the orifice of the die 2 installed at the front end of the extruder 1, the molten product is cut into a granular form and is simultaneously contacted with cooling water. Thus, the granules are rapidly cooled and thus solidify while expansion is suppressed. Thus, the granules become expandable polystyrene resin particles.

The formed expandable polystyrene resin particles are transported, together with the flow of cooling water, from the cutting chamber 7 to the dehydrating dryer 10 with a solid-liquid separating function. In the dehydrating dryer 10, the expandable polystyrene resin particles are separated from the cooling water and at the same time, dehydrated and dried. The dried expandable polystyrene resin particles are stored in the storage vessel 11.

Since the expandable polystyrene resin particles of the invention are particles prepared by adjusting the weight-average molecular weight Mw of the polystyrene resin in the range of 120,000 to 270,000, using a pentane having a mass ratio of isopentane:normal pentane in the range of 10:90 to 80:20 as an expanding agent. Thus, the amount of expanding agent to obtain the same expansion ratio can be reduced.

The expandable polystyrene resin particles of the invention are such that the decrease in expandability over time is small, and the bead life is long.

The expandable polystyrene resin particles of the invention have excellent low pressure expandability, and the water vapor pressure at the time of expansion molding can be lowered. Thus, energy saving can be promoted.

The molded foam product obtained by expansion molding the expandable polystyrene resin particles of the invention has sufficient mechanical strength, and particularly, even when a recycled raw material is used as the polystyrene resin, a mechanical strength that is close to that of a virgin raw material can be obtained.

EMBODIMENT

Embodiment 1

(Preparation of Polystyrene Resin)

In an autoclave having an internal volume of 6 m$^3$ and equipped with a stirrer, 2500 kg of a styrene monomer, 7.5 kg of tricalcium phosphate (manufactured by Taihei Chemical Industrial Co., Ltd.), 0.5 kg of sodium dodecyl benzenesulfonate, 15 kg of benzoyl peroxide (purity 75%), 1.2 kg of t-butyl peroxybenzoate, and 2500 kg of ion-exchanged water were supplied. Then the stirring blade of the stirrer in the autoclave was rotated at a stirring rate of 20 rpm to stir the inside of the autoclave. Thus, a suspension liquid was prepared.

Subsequently, while rotating the stirring blade at 20 rpm, the temperature inside the autoclave was raised to 90° C., and was maintained at 90° C. for 4 hours. The temperature inside the autoclave was then raised to 125° C., and was maintained at 125° C. for 2 hours. The autoclave was then cooled to 50° C. After cooling, the suspension liquid was removed from the autoclave, and was subjected to dehydration and washing repeatedly for several times. The suspension liquid was subjected to a drying step again, and thus polystyrene particles having a weight-average molecular weight of 164,000 were obtained.

(Preparation of Expandable Polystyrene Resin Particles)

0.3 parts by mass of finely powdered talc was added to 100 parts by mass of polystyrene particles (weight-average molecular weight 164,000) prepared as described above, and these particles were continuously supplied to a single-screw type extruder having an orifice diameter of 90 mm at a rate of 130 kg per hour. The temperature inside the extruder was set at a maximum temperature of 210° C. to melt the resin, and then 5 parts by mass of pentane (isopentane:normal pentane=20:80 (mass ratio)) based on 100 parts by mass of the resin was injected as an expanding agent in the middle of the extruder. The resin and the expanding agent were kneaded in the extruder and simultaneously cooled. By maintaining the resin temperature at the front end of the extruder at 170° C., and the pressure at the resin inlet of the die at 15 MPa, the expanding agent-containing molten resin was extruded from a die having 240 orifices each having a diameter of 0.6 mm and a land length of 2.5 mm, into the cutting chamber connected to the ejection side of this die, in which chamber water at 30° C. was circulated. At the same time, the extrusion product was cut with a rapidly rotating cutter having 10 blades along the peripheral direction. While the cut particles were cooled with the circulating water, the particles were conveyed to a particle separator to separate the particles from the circulating water. Furthermore, the captured particles were dehydrated and dried, and thus expandable polystyrene resin particles were obtained. The obtained expandable polystyrene resin particles did not have deformation, whiskers or the like, and were nearly perfect spheres. The average particle size was about 1.1 mm.

0.03 parts by mass of polyethylene glycol, 0.15 parts by mass of zinc stearate, 0.05 parts by mass of stearic acid monoglyceride, and 0.05 parts by mass of hydroxystearic acid triglyceride, based on 100 parts by mass of the obtained expandable polystyrene resin particles, were uniformly coated over the entire surface of the expandable polystyrene resin particles.

(Preparation of Molded Foam Product)

The expandable polystyrene resin particles prepared as described above were left to stand for 72 hours in a refrigerator at 15° C., and then were supplied into a cylindrical batch type pre-foaming machine. The expandable polystyrene resin particles were heated with water vapor at a blow pressure of 0.05 MPa, and thus pre-expanded particles were obtained. The obtained pre-expanded particles had a volume density of 0.02 g/cm$^3$ (volume expansion ratio: 50 times).

Subsequently, the obtained pre-expanded particles were left to stand in a room temperature atmosphere for 24 hours, and then the pre-expanded particles were filled into a molding mold having a rectangular-shaped cavity having a size of 400 mm in length×300 mm in width×50 mm in height. Then, the inside of the cavity of the molding mold was heated with water vapor at a gauge pressure of 0.08 MPa for 20 seconds, and then was cooled until the pressure inside the cavity of the molding mold reached 0.01 MPa. Subsequently, the molding mold was opened, and a rectangular-shaped molded foam product having a size of 400 mm in length×300 mm in width×50 mm in height was removed.

The obtained molded foam product had a density of 0.02 g/cm$^3$ (expansion ratio: 50 times).

The polystyrene resin, expandable polystyrene resin particles, pre-expanded particles and molded foam product of Example 1 prepared by the methods as described above, were subjected to the following evaluation and test.

(Measurement of Weight-Average Molecular Weight)

For the polystyrene resin that was used as a raw material introduced into the extruder, and the polystyrene resin constituting the expandable polystyrene resin particles produced according to the melt extrusion method, about 50 mg each of the resins were respectively immersed in 10 mL of THF (tetrahydrofuran) and were stored at room temperature for 24 hours.

This was filtered through a non-water-based 0.45-μm chromatodisk, and then the molecular weight calculated relative to polystyrene standards was measured using an HPLC (Detector 484, Pump 510) manufactured by Waters Corp. The measurement conditions were set up to use two columns of Shodex GPC K-806L (diameter 0.8 mm×length 300 mm) manufactured by Showa Denko K.K., at column temperature: 40° C., mobile phase: THF, mobile phase flow rate: 1.2 mL/min, injection pump temperature: room temperature, detection: UV 254 nm, and injection amount: 50 μL. Furthermore, as the polystyrene standards for calibration curve, Shodex (molecular weight 1,030,000) manufactured by Showa Denko K.K. and polystyrene products having molecular weights of 5,480,000, 3,840,000, 345,000, 102,000, 37900, 9100, 2630 and 495, manufactured by Tosoh Corp. were used.

For the measurement as described above, chloroform can also be used instead of THF.

(Measurement of Content of Expanding Agent and Composition of Expanding Agent)

The expandable polystyrene resin particles obtained in the Examples (and Comparative Examples) were left to stand for 72 hours in a refrigerator at 15° C., and then the amount of the expanding agent (total content of isopentane and normal pentane, unit: mass %) in the expandable polystyrene resin particles and the composition of the expanding agent (mass ratio of isopentane and normal pentane) were measured by using gas chromatography under the following conditions.

Gas chromatography (GC): GC-14B manufactured by Shimadzu Corp., detector: FID, heating furnace: PYR-1A manufactured by Shimadzu Corp., column: manufactured by Shinwa Chemical Industries, Ltd. (diameter 3 mm×length 3 m)

Liquid phase: squalane 25%, carrier: Shimalite 60 to 80 NAW, heating furnace temperature: 180° C., column temperature: 70° C.

(Evaluation of Bead Life)

The expandable polystyrene resin particles obtained in the Examples (and Comparative Examples) were stored for one month in a refrigerator at 15° C., and then the particles were supplied into a cylindrical batch type pre-foaming machine, and heated for 2 minutes with water vapor at a blowing water vapor pressure of 0.05 MPa. The volume expansion ratio of the obtained pre-expanded particles was measured as follows, and the bead life was evaluated on the basis of the following evaluation criteria:

A volume expansion ratio of 50 times or more was rated as ⊚.

A volume expansion ratio of equal to or more than 40 times and less than 50 times was rated as ○.

A volume expansion ratio of less than 40 times was rated as x.

(Volume Expansion Ratio of Pre-Expanded Particles)

The mass (a) of about 5 g of the pre-expanded particles was weighed to the second decimal place. Subsequently, the weighed pre-expanded particles were placed in a 500-cm$^3$ measuring cylinder having a minimum reading unit of 5 cm$^3$. And, a pressing instrument in which a rod-shaped resin plate having a width of about 1.5 cm and a length of about 30 cm was vertically standing and fixed at the center of a circular resin plate having a size slightly smaller than the opening of the measuring cylinder, was placed on the pre-expanded particles, to read the volume (b) of the pre-expanded particles. Thus, the volume expansion ratio of the pre-expanded particles was determined by the formula: (b)/(a).

(Evaluation of Low Pressure Expandability)

The pre-expanded particles were filled in a molding mold having a rectangular cavity having a size of 400 mm in length×300 mm in width×50 mm in height, and then the inside of the cavity of the molding mold was heated for 20 seconds with water vapor at a gauge pressure of 0.05 MPa. Subsequently, the molding mold was cooled until the pressure inside the cavity of the molding mold reached 0.01 MPa. Then, the molding mold was opened, and a rectangular-shaped molded foam product having a size of 400 mm in length×300 mm in width×50 mm in height was removed.

A notch line of about 5 mm in depth was inserted with a cutter knife along the center of the length direction of the obtained molded foam product (400 mm in length×300 mm in width×50 mm in height), and then the molded foam product was divided by hand into two parts (200 mm in length×300 mm in width×50 mm in height) along this notch line. For the expanded particles in the fractured surface, the number of particles fractured inside the expanded particle (a) and the number of particles fractured at the interface of expanded particles (b) were counted for any range of 100 to 150 particles, and the value obtained by substituting the formula: $[(a)/((a)+(b))] \times 100$ was designated as the fusion ratio (%). Then, the low pressure moldability was evaluated on the basis of the following evaluation criteria:

A fusion ratio of 80% or more was rated as ⊚.

A fusion ratio of equal to or more than 60% and less than 80% was rated as ○.

A fusion ratio of less than 60% was rated as x.

(Evaluation of High Pressure Moldability)

The pre-expanded particles were filled in a molding mold having a rectangular cavity having a size of 400 mm in length×300 mm in width×50 mm in height, and then the inside of the cavity of the molding mold was heated for 20 seconds with water vapor at a gauge pressure of 0.1 MPa. Subsequently, the molding mold was cooled until the pressure inside the cavity of the molding mold reached 0.01 MPa. Then, the molding mold was opened, and a rectangular-shaped molded foam product having a size of 400 mm in length×300 mm in width×50 mm in height was removed.

The surface state of the obtained molded foam product (400 mm in length×300 mm in width×50 mm in height) was observed by visual inspection, and the high pressure moldability was evaluated on the basis of the following evaluation criteria:

A molded foam product having no fusion at the surface was rated as ⊚.

A molded foam product having slight fusion at the surface was rated as ○.

A molded foam product having the entire surface fused was rated as x.

(Evaluation of Molding Cycle)

The pre-expanded particles were filled in a molding mold having a rectangular cavity having a size of 400 mm in length×300 mm in width×50 mm in height, and then the inside of the cavity of the molding mold was heated for 20 seconds with water vapor at a gauge pressure of 0.08 MPa. Subsequently, the cooling time was measured until the pressure inside the cavity of the molding mold reached 0.01 MPa. Thus, the molding cycle was evaluated on the basis of the following evaluation criteria:

A cooling time of less than 400 seconds was rated as ⊚.

A cooling time of equal to or more than 400 seconds and less than 500 seconds was rated as ○.

A cooling time of 500 seconds or more was rated as x.

(Measurement of Average Cell Diameter)

The molded foam products obtained in the Examples (and Comparative Examples) were cut with a razor blade, and photographs of the cut face were taken under a magnification of 30 times with a scanning electron microscope (S-3000N, manufactured by Hitachi, Ltd.). The photograph images were printed on A4 paper, and the average chord length (t) of the cells was calculated by the following formula from the number of cells present on an arbitrary straight line (length 60 mm). However, the arbitrary straight line was prevented as much as possible from contacting the cells only at a tangent point (if contacted, the cells are included in the number of cells). Measurement was made at 10 sites, and the average chord length was sought. Then, the cell diameter was calculated, and then the cell diameter was calculated and designated as average cell diameter D (μm).

$$\text{Average chord strength } t=60/(\text{number of cells} \times \text{magnification of photograph})$$

$$\text{Cell diameter } D=t/0.616 \times 1000$$

(Evaluation of Strength)

For the molded foam product obtained in the Examples (and Comparative Examples), the flexural strength was measured according to the method described in JIS A9511:2006 "Preformed cellular plastics thermal insulation materials."

That is, the flexural strength was measured using a Tensilon Universal Tester UCT-10T (manufactured by Orientech Co., Ltd.) and a test specimen having a size of 75 mm×300 mm×50 mm, under the conditions of a compression rate of 10 mm/min, with the front end jigs being a pressing wedge of 10R and a support of 10R, and the distance between fulcrums at 200 mm. The flexural strength was calculated by the following formula. The number of test specimens was 3, and the average value was determined.

Flexural strength (MPa)=$3 FL/2 bh^2$ (wherein F represents the maximum bending load (N), L represents the distance between fulcrums (mm), b represents the width (mm) of the test specimen, and h represents the thickness (mm) of the test specimen).

Thus, the average value of the flexural strength was determined, and the strength was evaluated on the basis of the following evaluation criteria:

A flexural strength of 0.25 MPa or greater was rated as ⊚.

A flexural strength equal to or greater than 0.22 MPa and less than 0.25 MPa was rated as ○.

A flexural strength less than 0.22 MPa was rated as x.

The measurement of the weight-average molecular weight, measurement of the content of expanding agent, evaluation of the bead life, evaluation of the low pressure expandability, evaluation of the high pressure moldability, evaluation of the molding cycle, measurement of the average cell diameter, and evaluation of the strength as described above were performed for Example 1. The results are presented in Table 1 and Table 2.

Example 2

The evaluation tests of the various items described above were performed in the same manner as in Example 1, except that a recycled raw material having a weight-average molecular weight of 163,000 was used instead of the polystyrene particles used in Example 1 (virgin polystyrene produced by a suspension polymerization method, weight-average molecular weight 164,000). The results are presented in Table 1 and Table 2.

Example 3

The evaluation tests of the various items described above were performed in the same manner as in Example 1, except that a recycled raw material having a weight-average molecular weight of 208,000 was used instead of the polystyrene particles used in Example 1 (virgin polystyrene produced by a suspension polymerization method, weight-average molecular weight 164,000). The results are presented in Table 1 and in Table 2.

Example 4

The evaluation tests of the various items described above were performed in the same manner as in Example 1, except that a recycled raw material having a weight-average molecular weight of 148,000 was used instead of the polystyrene particles used in Example 1 (virgin polystyrene produced by a suspension polymerization method, weight-average molecular weight 164,000), and a pentane having a composition of isopentane:normal pentane=40:60 (mass ratio) was used as an expanding agent. The results are presented in Table 1 and Table 2.

Example 5

The evaluation tests of the various items described above were performed in the same manner as in Example 1, except that a recycled raw material having a weight-average molecular weight of 127,000 was used instead of the polystyrene particles used in Example 1 (virgin polystyrene produced by a suspension polymerization method, weight-average molecular weight 164,000). The results are presented in Table 1 and Table 2.

Example 6

The evaluation tests of the various items described above were performed in the same manner as in Example 1, except that a recycled raw material having a weight-average molecular weight of 148,000 was used instead of the polystyrene particles used in Example 1 (virgin polystyrene produced by a suspension polymerization method, weight-average molecular weight 164,000). The results are presented in Table 1 and Table 2.

Example 7

The evaluation tests of the various items described above were performed in the same manner as in Example 1, except that a recycled raw material having a weight-average molecular weight of 163,000 was used instead of the polystyrene particles used in Example 1 (virgin polystyrene produced by a suspension polymerization method, weight-average molecular weight 164,000), and a pentane having a composition of isopentane:normal pentane=40:60 (mass ratio) was used as an expanding agent. The results are presented in Table 1 and Table 2.

Example 8

The evaluation tests of the various items described above were performed in the same manner as in Example 1, except that a recycled raw material having a weight-average molecular weight of 148,000 was used instead of the polystyrene particles used in Example 1 (virgin polystyrene produced by a suspension polymerization method, weight-average molecular weight 164,000), and a pentane having a composition of isopentane:normal pentane=80:20 (mass ratio) was used as an expanding agent. The results are presented in Table 1 and Table 2.

Example 9

The evaluation tests of the various items described above were performed in the same manner as in Example 1, except that a recycled raw material having a weight-average molecular weight of 163,000 was used instead of the polystyrene particles used in Example 1 (virgin polystyrene produced by a suspension polymerization method, weight-average molecular weight 164,000), and a pentane having a composition of isopentane:normal pentane=80:20 (mass ratio) was used as an expanding agent. The results are presented in Table 1 and Table 2.

Example 10

The evaluation tests of the various items described above were performed in the same manner as in Example 1, except that a commercially available recycled raw material (manufactured by Echolife Tosa Co., Ltd; limonene-recycled raw material, weight-average molecular weight 254,000) was used instead of the polystyrene particles used in Example 1 (virgin polystyrene produced by a suspension polymerization method, weight-average molecular weight 164,000). The results are presented in Table 1 and Table 2.

Example 11

The evaluation tests of the various items described above were performed in the same manner as in Example 1, except that a recycled raw material having a weight-average molecular weight of 187,000 was used instead of the polystyrene particles used in Example 1 (virgin polystyrene produced by a suspension polymerization method, weight-average molecular weight 164,000). The results are presented in Table 1 and Table 2.

Comparative Example 1

The evaluation tests of the various items described above were performed in the same manner as in Example 1, except that a recycled raw material having a weight-average molecular weight of 107,000 was used instead of the polystyrene particles used in Example 1 (virgin polystyrene produced by a suspension polymerization method, weight-average molecular weight 164,000). The results are presented in Table 1 and Table 2.

Comparative Example 2

The evaluation tests of the various items described above were performed in the same manner as in Example 1, except that a commercially available recycled raw material (manufactured by Echolife Tosa Co., Ltd; a limonene-recycled raw material, having a weight-average molecular weight 283,000) was used instead of the polystyrene particles used in Example 1 (a virgin polystyrene produced by a suspension polymerization method, having a weight-average molecular weight 164,000). The results are presented in Table 1 and Table 2.

Comparative Example 3

The evaluation tests of the various items described above were performed in the same manner as in Example 1, except that a recycled raw material having a weight-average molecular weight of 148,000 was used instead of the polystyrene particles used in Example 1 (a virgin polystyrene produced by a suspension polymerization method, having a weight-average molecular weight 164,000), and only isopentane (isopentane:normal pentane=100:0) was used as an expanding agent. The results are presented in Table 1 and Table 2.

Comparative Example 4

The evaluation tests of the various items described above were performed in the same manner as in Example 1, except that a recycled raw material having a weight-average molecular weight of 163,000 was used instead of the polystyrene particles used in Example 1 (virgin polystyrene produced by a suspension polymerization method, weight-average molecular weight 164,000), and only isopentane (isopentane:normal pentane=100:0) was used as an expanding agent. The results are presented in Table 1 and Table 2.

Comparative Example 5

The evaluation tests of the various items described above were performed in the same manner as in Example 1, except that a recycled raw material having a weight-average molecular weight of 208,000 was used instead of the polystyrene particles used in Example 1 (virgin polystyrene produced by a suspension polymerization method, having a weight-average molecular weight 164,000), and only normal pentane (isopentane:normal pentane=0:100) was used as an expanding agent. The results are presented in Table 1 and Table 2.

TABLE 1

| Item | Raw material resin used | Manufacturer | Product name | Weight-average molecular weight of raw material resin (Mw) |
|---|---|---|---|---|
| Example 1 | Virgin polystyrene | Sekisui Chemical Co., Ltd. | — | 164,000 |
| Example 2 | Recycled raw material | — | — | 163,000 |
| Example 3 | Recycled raw material | — | — | 208,000 |
| Example 4 | Recycled raw material | — | — | 148,000 |
| Example 5 | Recycled raw material | — | — | 127,000 |
| Example 6 | Recycled raw material | — | — | 148,000 |
| Example 7 | Recycled raw material | — | — | 163,000 |
| Example 8 | Recycled raw material | — | — | 148,000 |
| Example 9 | Recycled raw material | — | — | 163,000 |
| Example 10 | Recycled raw material | Echolife Tosa | Limonene recycled raw material | 254,000 |
| Example 11 | Recycled raw material | — | — | 187,000 |
| Comp. Ex. 1 | Recycled raw material | — | — | 107,000 |
| Comp. Ex. 2 | Recycled raw material | Echolife Tosa | Limonene recycled raw material | 283,000 |
| Comp. Ex. 3 | Recycled raw material | — | — | 148,000 |
| Comp. Ex. 4 | Recycled raw material | — | — | 163,000 |
| Comp. Ex. 5 | Recycled raw material | — | — | 208,000 |

The manufacturer and the product name are not given; Polystyrene resin recovered raw materials (recycled raw materials) having a weight-average molecular weight (Mw) as indicated in the table were used.

a weight-average molecular weight Mw of 107,000, which is less than the Mw range of the invention, is used as the polystyrene resin. Regarding these expandable polystyrene resin particles obtained in the Comparative Example 1, the high

TABLE 2

| Item | Weight-average molecular weight of raw material resin (Mw) | Weight-average molecular weight of expandable resin particles (Mw) | Composition of expanding agent upon extrusion | | Content of expanding agent (mass %) | Composition of expanding agent | | Bead life |
|---|---|---|---|---|---|---|---|---|
| | | | Isopentane | Normal pentane | | Isopentane | Normal pentane | |
| Example 1 | 164,000 | 159,000 | 20 | 80 | 4.3 | 21 | 79 | ◎ |
| Example 2 | 163,000 | 158,000 | 20 | 80 | 4.2 | 22 | 78 | ◎ |
| Example 3 | 208,000 | 207,000 | 20 | 80 | 4.3 | 22 | 78 | ○ |
| Example 4 | 148,000 | 141,000 | 40 | 60 | 4.3 | 42 | 58 | ◎ |
| Example 5 | 127,000 | 122,000 | 20 | 80 | 4.1 | 23 | 77 | ◎ |
| Example 6 | 148,000 | 140,000 | 20 | 80 | 4.2 | 22 | 78 | ◎ |
| Example 7 | 163,000 | 157,000 | 40 | 60 | 4.4 | 42 | 58 | ◎ |
| Example 8 | 148,000 | 142,000 | 80 | 20 | 4.5 | 81 | 19 | ◎ |
| Example 9 | 163,000 | 158,000 | 80 | 20 | 4.5 | 82 | 18 | ◎ |
| Example 10 | 254,000 | 251,000 | 20 | 80 | 4.4 | 21 | 79 | ○ |
| Example 11 | 187,000 | 183,000 | 20 | 80 | 4.3 | 22 | 78 | ◎ |
| Comp. Ex. 1 | 107,000 | 102,000 | 20 | 80 | 4 | 22 | 78 | ◎ |
| Comp. Ex. 2 | 283,000 | 280,000 | 20 | 80 | 4.4 | 21 | 79 | X |
| Comp. Ex. 3 | 148,000 | 141,000 | 100 | 0 | 4.6 | 100 | 0 | ◎ |
| Comp. Ex. 4 | 163,000 | 157,000 | 100 | 0 | 4.6 | 100 | 0 | ◎ |
| Comp. Ex. 5 | 208,000 | 206,000 | 0 | 100 | 4.2 | 0 | 100 | X |

| Item | Low pressure moldability | High pressure moldability | Molding cycle | Average cell diameter (mm) | Strength | Overall evaluation |
|---|---|---|---|---|---|---|
| Example 1 | ◎ | ◎ | ◎ | 250 | ◎ | ◎ |
| Example 2 | ◎ | ◎ | ◎ | 222 | ◎ | ◎ |
| Example 3 | ○ | ◎ | ◎ | 312 | ◎ | ○ |
| Example 4 | ◎ | ◎ | ◎ | 278 | ◎ | ◎ |
| Example 5 | ◎ | ○ | ○ | 342 | ○ | ○ |
| Example 6 | ◎ | ◎ | ◎ | 287 | ◎ | ◎ |
| Example 7 | ◎ | ◎ | ◎ | 227 | ◎ | ◎ |
| Example 8 | ○ | ○ | ○ | 212 | ◎ | ○ |
| Example 9 | ○ | ○ | ○ | 328 | ◎ | ○ |
| Example 10 | ○ | ◎ | ◎ | 239 | ◎ | ○ |
| Example 11 | ◎ | ◎ | ◎ | 261 | ◎ | ◎ |
| Comp. Ex. 1 | ◎ | X | X | 318 | X | X |
| Comp. Ex. 2 | X | ◎ | ◎ | 273 | ◎ | X |
| Comp. Ex. 3 | ◎ | ◎ | X | 214 | ◎ | X |
| Comp. Ex. 4 | ◎ | ◎ | X | 230 | ◎ | X |
| Comp. Ex. 5 | X | ○ | ◎ | 345 | ○ | X |

As it can be seen from the results of Table 1 and Table 2, Example 1 to Example 10 according to the invention are such that the weight-average molecular weight Mw of the polystyrene resin is in the range of 120,000 to 270,000, and the expanding agent contains a pentane having a composition in the range of isopentane:normal pentane=10:90 to 80:20 by mass as a main component. Thus, Example 1 to Example 10 are excellent in both low pressure expandability and high pressure expandability. Particularly, since the low pressure expandability is satisfactory, the heating time to obtain an expandable molded foam product can be shortened, and energy saving can be promoted.

Furthermore, the molded foam products obtained in Example 1 to Example 10 according to the invention have sufficient mechanical strength. Particularly, even when a recycled raw material is used as the polystyrene resin, a mechanical strength that is close to the strength obtained in the case of using a virgin raw material, can be obtained.

On the other hand, Comparative Example 1 represents the case where a low molecular weight polystyrene resin having pressure moldability is low, and it is prone to generate fusion at the surface of a molded foam product, and the strength of the obtained molded foam product is decreased.

Comparative Example 2 represents the case where a high molecular weight polystyrene resin having a weight-average molecular weight Mw of 283,000, which is greater than the Mw range of the invention, is used as the polystyrene resin. These expandable polystyrene resin particles obtained in the Comparative Example 2 have a short bead life, and have a problem in long-term storage. Furthermore, the low pressure moldability is low, the water vapor pressure at the time of expansion molding cannot be lowered, and energy saving at the time of expansion molding cannot be promoted.

Comparative Example 3 and Comparative Example 4 represent the cases of using isopentane only as the expanding agent. Regarding these expandable polystyrene resin particles obtained in the Comparative Example 3 and Comparative Example 4, the cooling time for obtaining a molded foam product takes long, the molding cycle cannot be shortened, and productivity is decreased.

Comparative Example 5 represents the case of using normal pentane only as the expanding agent. These expandable polystyrene resin particles obtained in the Comparative Example 5 have a short bead life and have a problem in long-term storage. Furthermore, the low pressure moldability is low, the water vapor pressure at the time of expansion molding cannot be lowered, and energy saving at the time of expansion molding cannot be promoted.

INDUSTRIAL APPLICABILITY

As discussed above, according to the invention, a molded foam product having sufficient mechanical strength can be produced using a recycled raw material, and expandable polystyrene resin particles which have a long bead life and excellent low pressure moldability can be provided.

The invention claimed is:

1. Expandable polystyrene resin particles obtained by a melt extrusion method for obtaining expandable polystyrene resin particles by injecting and kneading an expanding agent into a molten polystyrene resin in an extruder, extruding the molten resin containing the expanding agent directly into a liquid for cooling through an orifice of a die installed at the front end of the extruder, and cutting the extrusion product with a rapidly rotating blade simultaneously with the extruding, while solidifying the extrusion product by cooling through contact with the liquid, wherein the weight-average molecular weight Mw of the polystyrene resin after the melt extrusion method is performed is in a range of 120,000 to 270,000, and the expanding agent after the melt extrusion method is performed contains, as an essential component, pentane at a proportion of 3 to 5.5 parts by mass based on 100 parts by mass of the polystyrene resin, and a composition of the pentane is in the range of isopentane:nonnal pentane=10:90 to 80:20 by mass ratio.

2. The expandable polystyrene resin particles according to claim 1, wherein a weight-average molecular weight Mw of the polystyrene resin is in the range of 140,000 to 215,000.

3. The expandable polystyrene resin particles according to claim 1, wherein a weight-average molecular weight Mw of the polystyrene resin is in the range of 140,000 to 185.000.

4. The expandable polystyrene resin particles according to claim 1, wherein a weight-average molecular weight Mw of the polystyrene resin is in the range of 140,000 to 165,000.

5. The expandable polystyrene resin particles according to claim 1, thriller comprising a talc.

* * * * *